(12) United States Patent
Yang

(10) Patent No.: US 9,436,269 B2
(45) Date of Patent: Sep. 6, 2016

(54) AUTOMATICALLY ADJUSTING DISPLAY AREAS TO REDUCE POWER CONSUMPTION

(71) Applicant: Intel Corporation, Santa Clara, CA (US)

(72) Inventor: Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 14/126,897

(22) PCT Filed: May 16, 2013

(86) PCT No.: PCT/CN2013/075695
§ 371 (c)(1),
(2) Date: Dec. 17, 2013

(87) PCT Pub. No.: WO2014/183288
PCT Pub. Date: Nov. 20, 2014

(65) Prior Publication Data
US 2014/0344608 A1    Nov. 20, 2014

(51) Int. Cl.
*G06F 1/32*    (2006.01)

(52) U.S. Cl.
CPC ........... *G06F 1/3287* (2013.01); *G06F 1/3265* (2013.01); *Y02B 60/1242* (2013.01); *Y02B 60/1282* (2013.01); *Y02B 60/32* (2013.01)

(58) Field of Classification Search
CPC ............. G09G 3/3696; G09G 3/3648; G09G 3/3688; G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,881,299 A * | 3/1999 | Nomura | G06F 1/3218 345/103 |
| 7,036,025 B2 * | 4/2006 | Hunter | G09G 3/342 700/12 |
| 2005/0052446 A1 | 3/2005 | Plut | |
| 2006/0087502 A1 * | 4/2006 | Karidis | G06F 1/3203 345/211 |
| 2006/0132474 A1 * | 6/2006 | Lam | G09G 3/20 345/204 |
| 2010/0164857 A1 * | 7/2010 | Liu | G09G 3/3426 345/102 |
| 2013/0069888 A1 * | 3/2013 | Cho | G06F 1/3265 345/173 |

(Continued)

FOREIGN PATENT DOCUMENTS

| CN | 102646018 | 8/2012 |
|---|---|---|
| CN | 102681648 | 9/2012 |
| CN | 102789303 | 11/2012 |

OTHER PUBLICATIONS

English translation of CN 2012075199, Gouhua Sun , Feb. 21, 2012.*

U.S. Appl. No. 13/977,672, filed Oct. 25, 2013, entitled "Displaying Area Adjustment," by Wenlong Yang.

(Continued)

*Primary Examiner* — Zahid Choudhury
(74) *Attorney, Agent, or Firm* — Trop, Pruner & Hu, P.C.

(57) ABSTRACT

In an embodiment, a method includes receiving user interface information having event registrations for a user interface to be displayed on a display of a system, partitioning the display into an unused display area and an active display area based on the event registrations, and power managing the unused display area while maintaining the active display area fully powered. Other embodiments are described and claimed.

19 Claims, 10 Drawing Sheets

(56) References Cited

U.S. PATENT DOCUMENTS

| | | | |
|---|---|---|---|
| 2014/0053097 A1* | 2/2014 | Shin | G06F 9/4443 715/779 |
| 2014/0092140 A1* | 4/2014 | Wadhwa | G09G 3/20 345/660 |
| 2015/0061988 A1* | 3/2015 | Galu, Jr. | G06F 1/3265 345/102 |
| 2015/0102992 A1* | 4/2015 | Klement | G06F 1/3228 345/102 |
| 2015/0187283 A1* | 7/2015 | Jiang | G09G 3/3406 345/690 |

OTHER PUBLICATIONS

Taiwan Patent Office, Taiwanese Office Action mailed Jun. 10, 2015, in Taiwanese Patent Application No. 103116090 (Translation Redacted).

International Searching Authority, "Notification of Transmittal of the International Search Report and the Written Opinion of the International Searching Authority," mailed Feb. 27, 2014, in International application No. PCT/CN2013/075695.

Taiwan Intellectual Property Office, Decision of Rejection mailed Dec. 31, 2015 in Taiwanese Patent Application No. 103116090. (Redacted).

* cited by examiner

AUTOMATICALLY ADJUSTING DISPLAY AREAS TO REDUCE POWER CONSUMPTION

TECHNICAL FIELD

Embodiments relate to computing devices and more particularly to power management for displays of such computing devices.

BACKGROUND

Battery-powered portable electronic devices such as mobile form factor devices are useful only as long as the battery has enough charge. Device features that are active or running, however, may affect how long the battery stays charged; some features may consume more battery power than others may. If battery-consuming features are enabled, the battery may need to be recharged more frequently. If, however, such features are not enabled a user may lose a benefit of the portable electronic device. To avoid complete loss of such a benefit, the user may resort to frequent enabling and disabling of a particular device feature.

The display of a portable electronic device is a feature that is a big consumer of battery charge. This may be exacerbated if the device display is relatively large compared to the device size as a whole. Since a user typically interacts with the portable electronic device through an interface displayed on the display screen, the user cannot simply turn off the display and still use other features of the portable electronic device. Thus, to save battery, the user may turn the display completely off or dim the light for the entire display. But to use the portable electronic device, it may be necessary to turn the display back on, increase the intensity of the display light, or both.

DETAILED DESCRIPTION

Figure 1:
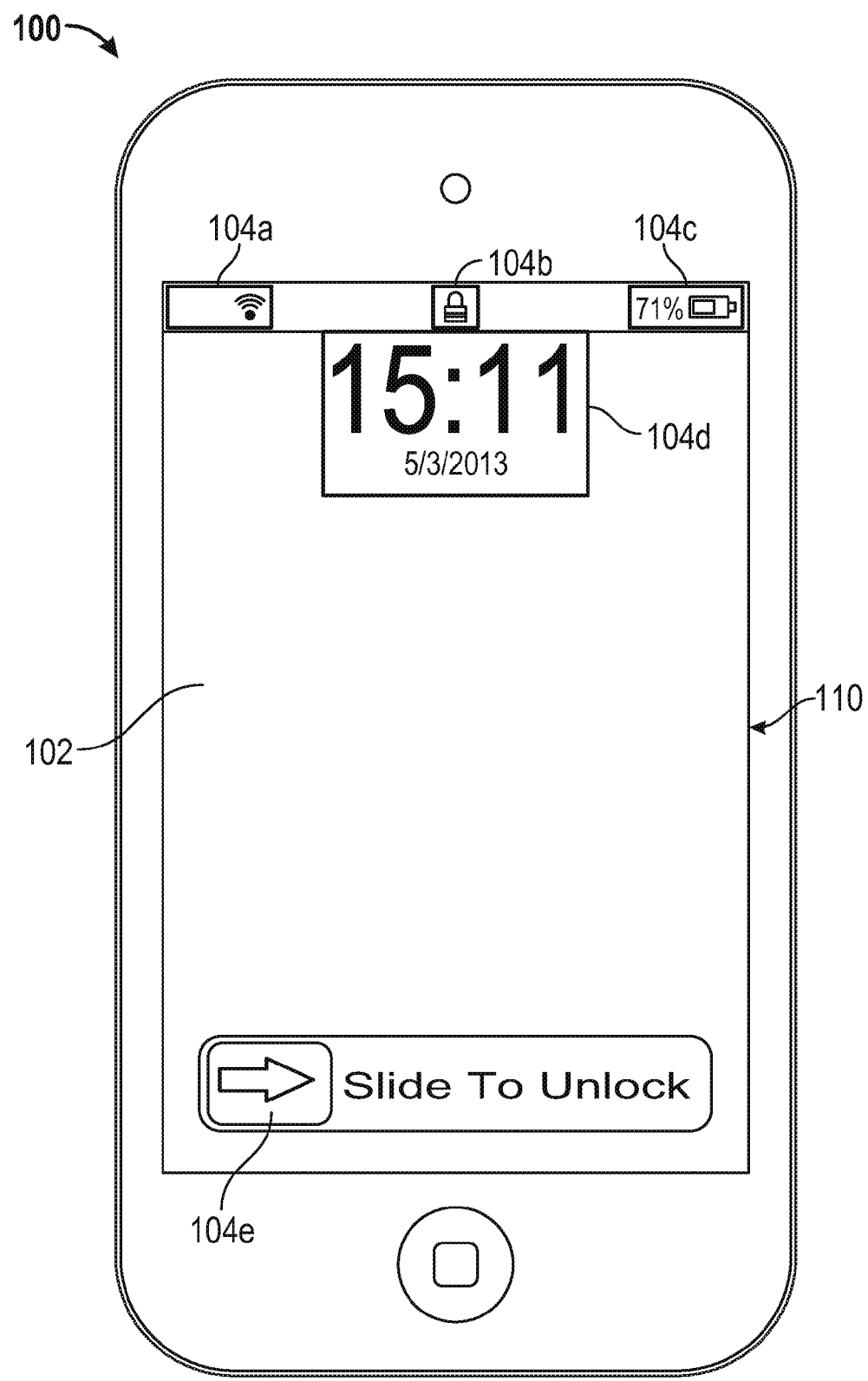
FIG. 1 is a block diagram of a portable electronic device (PED) having a display in accordance with an embodiment of the present invention.

An embodiment of a portable electronic device may conserve power while in a normal operating mode by switching from an original screen mode to an adjusted screen mode. While in adjusted screen mode, the device display may include at least one active display area and at least one inactive display area. An extract from a user interface may be displayed in the active display area and the adjustable display area may be adjusted to occupy less than the entire display screen. Thus, at least a portion of the adjusted display area perimeter may be adjacent to the inactive display area, which may extend to the periphery of the display screen. Thus, the inactive display area may fill the portion of the display screen that is not being used to display the extract of the user interface in the adjustable display area. The inactive display area may use less power than an active area such as the adjustable display area or a full-size display screen. Thus, while in the adjusted screen mode, the display may not be turned off or entirely dimmed to conserve power and yet allow the user to see and/or use at least a portion of an original interface in the adjusted display area.

Embodiments may further be used to automatically determine appropriate display areas to control to be in a reduced power mode based on content to be displayed. That is, during a typical display of information on a display, some parts of the display are not relevant for providing content or receiving user input. Accordingly, such display portions may be controlled to be powered down or consume a lesser amount of power. For example, on a desktop screen, only icons/shortcuts may be relevant and the background can be appropriately controlled to reduce power consumption. Embodiments may be used to automatically determine which display areas are not currently being used, or less used, and control them appropriately. Note that this automatic determination does not rely on any indications of power management or other information from applications that request display of information. Instead, as discussed more fully below, event registrations associated with display operations themselves may be used to guide display power management. The control may include, in different embodiments, causing these areas to be as black or white (depending on the type of the display device), reducing brightness and/or resolution, etc. Embodiments may automatically detect such areas and adjust the display areas for power saving without function sacrifice during normal use.

Although the scope of the present invention is not limited in this regard, in an embodiment an operating system (OS) capability, referred to herein as Display Area Auto-adjustment Mode (DAAM), may be used to perform this automatic control. This mode may be triggered by an appropriate user selection. In DAAM, the OS detects and adjusts some parts of the display automatically for power saving by dynamically analyzing the display based on the following principles. If there is no display/response-related events (for example, painting event, touch event, etc.) registered for a given display area, the OS may directly control the display area by turning off pixels or adjusting display areas for power saving directly. When controlling by turning off pixels to save power, if there is a limited number of display/response events or background-related events (for example, slide, long hold for shortcuts, etc.) registered for the display area, a predetermined sub-area is assigned for these functions and the rest of the display area is controlled for power saving.

In various embodiments, DAAM is not influenced by any power mode. For example, if the system enters a sleep state or performs a restart, this mode still functions. In this way, a user can keep power saving even after system reboot or power state changes. Optionally, an additional function can be added to enable the user to modify a specific screen's active display areas if he/she thinks the auto-filtering provided by the OS is not appropriate. The OS may store this modification, so that when that specific screen is shown a next time, it will appear as modified by the user. Also, the user can reset the mode back to auto-filtering again if desired. In DAAM, the OS may perform auto-filtering dynamically every time the display changes. In some embodiments, an icon or status bar may be used to indicate presence of DAAM mode to the user. Using DAAM in accordance with an embodiment of the present invention, only relevant portions of a display may be powered. And, this control may be performed automatically based on the current image to be displayed. Also DAAM provides the capability of large display power saving with only necessary screen areas displayed automatically and without large user experience sacrifice, so the battery can last a longer time.

Referring to FIG. 1, shown is a portable electronic device (PED) 100 having a display 102. PED 100 can be any type of portable electronic device such as a mobile telephone (e.g., smartphone), a tablet computer, a laptop computer, an Ultrabook™ computer, an electronic reader, a gaming system, a music player, a camera, a video recorder, a scanner, a printer, a tool (e.g., a die-cut machine, or other machine or tool having a display screen associated therewith), and the like. Similarly, the display 102 can be any type of display such as a liquid crystal display (LCD), a light emitting diode (LED) display, and/or an organic light emitting diode (OLED) display to name a few general examples. Furthermore, the display 102 may include a touch screen that is sensitive to both single touch and two or more simultaneous touches. The touch screen may be any type of touch screen such as resistive or capacitive (e.g., self, mutual, projected), acoustic wave and/or infrared (IR) sensitive, or having touch sensors.

As seen in FIG. 1, a lock screen image is presented. This lock screen may be displayed when PED 100 is in a standby mode, waiting for a user input such as by way of a slide gesture to enable the device for further operation. Using an embodiment of the present invention, in a DAAM mode a large portion of the display area of display 102, namely display area 110 may be automatically identified as a useless area and accordingly can be controlled to be in a powered off state, thus reducing power consumption of the display. Other areas of display 102, namely display areas 104a-104e, may be in an active state. That is, these display areas may have events registered to them such as display events or response events. Specifically, display areas 104a-104d provide status information viewable in DAAM mode, while display area 104e indicates a location for user input such as via a touch screen overlaid on display 102. Note that each image present in the active display areas may be one of text or a graphic such as an icon, a tile, a button, a menu item, a photograph, or so forth.

Inactive display area 110 corresponds to the part of the display screen that is not an active display area. Inactive display area 110 may be turned off, at rest, or otherwise not available for active use. For an example, in an embodiment, inactive display area 110 may be black. But the actual appearance of inactive display area 110 may depend on the display type (e.g., LCD, OLED), display design, how inactive display area 110 is created, and combinations thereof.

For example, in an embodiment, display 102 may include liquid crystal display (LCD) technology such as thin film transistor (TFT) LCD technology and/or in-plane switching (IPS) LCD technology. Since liquid crystals do not emit light, an LCD display 102 may include a light source such as a backlight or an edge light. A backlight may include one or more display lights such as lamps (e.g., hot or cold cathode fluorescent lamps) or light emitting diodes (LEDs). In an embodiment, the display lights of a backlight may cover all (e.g., full array) or part (e.g., sparse array) of the back of the display screen. In an embodiment, the one or more display lights may be located at the edge of the display to create the edge light. An edge light may be used as an alternative to the backlight or in addition to the backlight.

Generally, and at a very high level, liquid crystals act as a gate that may prevent or variably allow light from the display lights to pass through subpixels (e.g., one each for red, green, and blue). Whether or not light passes through a subpixel that is at rest (e.g., none or little varying electrical charge applied to subpixel transistor) may depend on the design of the LCD.

In an embodiment, pixels and/or subpixels in inactive display area 110 may be at rest, receiving little if any electrical charge. Thus, inactive display area 110 may be dark if light from display lights is blocked while the pixels/subpixels are at rest. Alternatively, inactive display area 110 may be white or another color (depending on how much charge is applied to subpixels) if light from display lights is not blocked while the subpixels are at rest. As such, an embodiment should not be limited to a particular color of inactive display area 110. For ease of reference, inactive display area 110 is unfilled/white in FIG. 1.

Furthermore, in an embodiment the LCD display lights may be selectively dimmed or turned off to create or augment inactive display area 110. Such dimming/turning off may affect the color of inactive display area 110 making it appear dark or even black. For example, in an embodiment, the LCD display lights may be a full or scattered array of LEDs. A controller may selectively dim or turn off the LEDs proximate inactive display area 110 making inactive display area 110 darker than the active display areas 104a-104e. The LEDs proximate the active display area, however, may be at the same or similar intensity as in a non-power saving mode. Thus, if display lights proximate pixels that define inactive display area 110 are dimmed or turned off, inactive display area 110 may be dark even if resting pixels/subpixels do not block light.

Not all displays utilize an external light source. For example, displays using organic light emitting diode (OLED) technology do not use a backlight or edge light. OLEDs can be fluorescent, active matrix, phosphorescent, transparent, and combinations thereof. Generally, and at a very high level, OLED pixels emit photons in response to receiving an electrical charge, which is why an external light source is not required for an OLED display. Thus, in an embodiment, inactive display area 110 may result from OLED pixels that are at rest, receiving little if any charge. The appearance of inactive display area 110 may be a function of what the display screen looks like when OLED pixels are at rest. If no photons are emitted then inactive display area 110 may be dark. In an embodiment, the organic material may be a phosphorescent organic material (e.g., PHOLED). PHOLED displays may consume less power than LCD displays and produce intense color.

Taking the forgoing together, display 102 may use less power, including battery power, when in DAAM than when PED 100 is in a standard, normal-use operating mode. Furthermore, the degree to which power is saved may depend on several factors such as display type (e.g., LCD, OLED), external display lights (e.g., type, distribution, selective use), and the size of inactive display area 110.

Generally, images or graphics rendered on display 102 may be processed by a display adapter, graphics adapter, graphics accelerator, graphics engine, graphics co-processor, a digital signal processor (DSP), a central processor, graphics processing unit (GPU), and or any other graphics hardware or software, and combinations thereof. For example, a display adapter may include one or more GPUs and/or one or more controllers. The display adapter may process data for graphics rendering and may convert rendered patterns (e.g., bitmap) into signals for display screen. This is but one high-level example of how images may be rendered on display screen; embodiments are not limited by how images are rendered on display 102.

Display 102 may be switched into DAAM in response to a user command, such as input received from the touch screen, accelerometer, or gyroscope. Switching into this mode may also be in response to user input received from a keyboard, menu selection, mouse clicks, and the like.

In an embodiment, display 102 may also be automatically switched into DAAM, such as if selected by the user as the default display mode or in response to detecting that the battery is has reached a predetermined threshold. For example, if the battery reaches a capacity that is at or below a certain percentage of total battery capacity (e.g., 30%, 25%, 20%, 15%, 10%, 5%) display 102 may be automatically switched to DAAM to conserve the remainder of the battery power. Furthermore, display 102 may be controlled to be in a DAAM configuration (e.g., size/placement of reduced size display area and inactive display area) determined to use the least amount of battery while still being of benefit to the user. In an embodiment, display screen configuration responsive to a determination of a low battery may be a default configuration or one that is preconfigured by the user. Additionally, the threshold battery level at which display 102 is switched to DAAM may be a default value or a value designated by the user.

Figure 2:
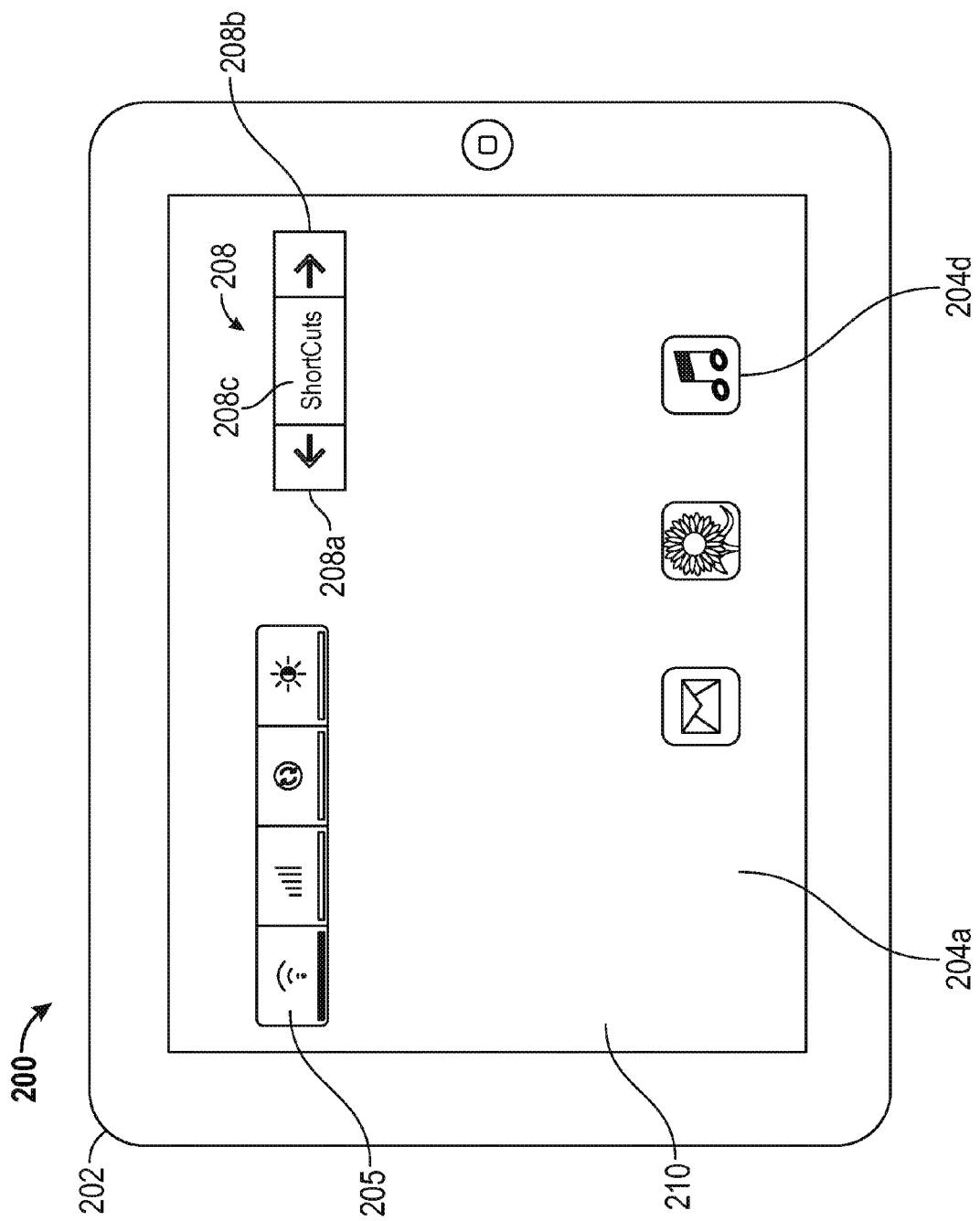
FIG. 2 is an illustration of another portable device having a display in accordance with an embodiment of the present invention.

Referring now to FIG. 2, shown is an illustration of another portable device 200 providing for a display in accordance with an embodiment of the present invention. As shown in FIG. 2, computing device 200 may be a tablet computer or other portable electronic device having a display 202.

In the illustration shown in FIG. 2, a desktop screen is presented that includes a plurality of active display areas 204a-204d. As seen, each of these active display areas corresponds to an icon that enables a user selection of an application or other function. An additional display area 205 is used to present a variety of selectable functionalities or user notifications. In addition, a display area 208 may be provided in DAAM. This area is not of a given user interface as would appear in non-DAAM operation, and instead is generated in DAAM to provide certain functionality in a reduced display area, increasing power saving opportunities.

In the embodiment shown, display area 208 enables a user to perform various background touch functions such as via a move left button 208a and a move right button 208b, as well as a command shortcut button 208c. As will be described further herein, display area 208 is displayed instead of other content that would either be located in this or another portion of the display in non-DAAM operation. As a result, a remainder of display 202, namely an inactive display area 210, can be maintained in a powered down state or other state to reduce power consumption. Thus where a limited amount of events are registered for activity in a particular display area, this reduced sub-display area 208 may enable greater power savings by actively modifying the otherwise present display information.

Inactive area 210 is turned off (adjusted for power saving) and only active display areas will respond to touch operations. To replace the traditional touch operations for the background, display area 208 is thus provided (e.g., by the OS) to include several virtual buttons. In this way, the OS can realize greater power savings during normal use with the unused or useless display areas adjusted automatically. Note also that this auto-adjustment capability is in addition to other capabilities of the OS (e.g., adjusting lights, adjusting voice volume, etc.).

Figure 3:
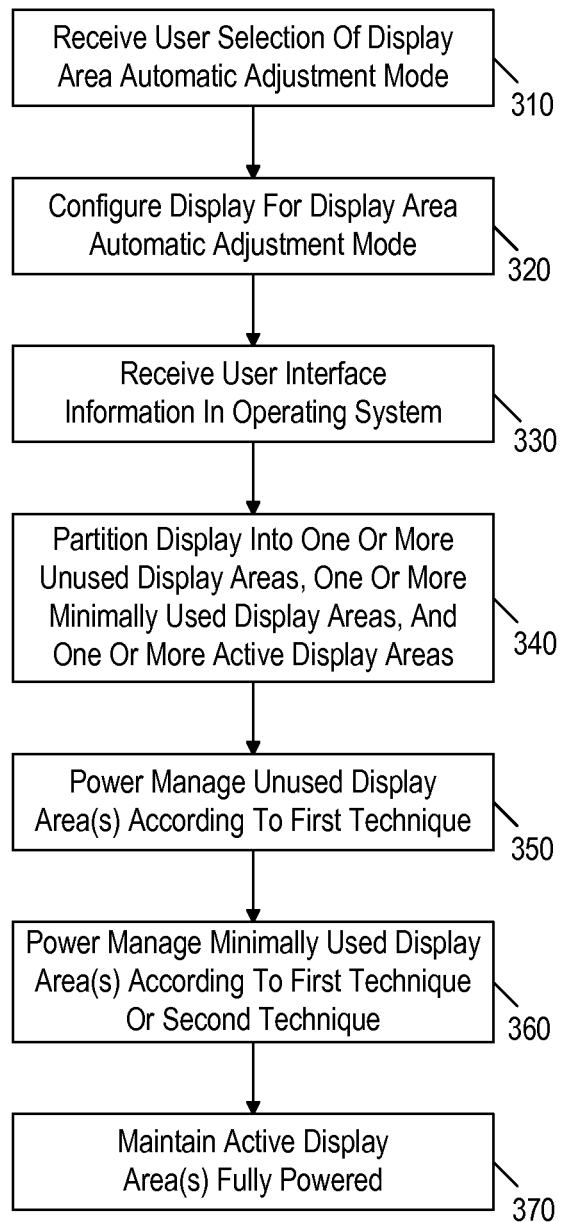
FIG. 3 is a flow diagram of a method for performing automatic display adjustments in accordance with an embodiment of the present invention.

Referring now to FIG. 3, shown is a flow diagram of a method for performing automatic display adjustments in accordance with an embodiment of the present invention. As shown in FIG. 3, method 300 may be performed using various hardware of a system. For example, a processor such as a central processing unit (CPU) may be used to execute the method. More specifically, an operating system (OS) that executes on the CPU may perform some or all of method 300.

As seen, method 300 begins by receiving a user selection of a display area automatic adjustment mode (DAAM) (block 310). This selection may be via a user selection of a configurable platform setting, which may be one of many different power management settings or display settings. Next control passes to block 320 where the display can be configured for this display mode. In an embodiment, this configuration may include setting an enable flag or other indicator in a configuration storage to indicate that the display is to operate according to this mode.

Still referring to FIG. 3, control next passes to block 330 where user interface information may be received in the OS. This user interface information may correspond to details regarding information to be displayed on the display for a given user interface. Such interface information may include, for example, an indication of the information to be displayed or a lock screen, a home screen, or another graphical user interface to be presented on the display. In addition, this user interface information may include event registrations, which indicate display events, user response events, and so forth. As an example the events are registered or invoked to the OS by software having a graphical user interface to be shown. Various events such as touch events, painting events (to refresh the user interface) and so forth may be registered. From these events registered/invoked, the OS can determine which part(s) of the user interface is waiting for a response of a given kind of event (e.g., a touch input), or to refresh the display for a given part of the user interface.

Referring still to FIG. 3, control passes to block 340 where the display can be partitioned into a plurality of display areas. More specifically, different regions of the display can be identified based on the information to be presented in the given region. As shown in FIG. 3, the display can be partitioned into one or more unused display areas in which no display (or user input) is to take place, one or more minimally used display areas in which background information or a limited amount of information is to be displayed, and one or more active display areas in which all or a large portion of the area is to be active to display content or to enable receipt of user input such as by way of a touch screen adapted upon the display. After partitioning the display into these one or more different display areas, control passes to block 350 where the unused display areas may be power managed according to a first technique. Note that different techniques are possible and may be based on user selection of an appropriate technique to reduce power consumption. Examples of different techniques include powering off such unused display areas, reducing a brightness and/or resolution of such display areas, among other such operations. For purposes of discussion, assume that the first technique is powering off the unused display areas. By power managing these unused display areas, significant power savings may be realized for the system.

Control next passes to block 360 where minimally used display areas may be power managed according to either this first technique or a second technique. Assume still that the first technique is a power off technique. In this instance, the second technique may include reducing brightness and/or resolution, or reducing an amount of information presented in such display areas. Finally at block 370, the active display areas may remain fully powered such that the content within these display areas remains fully visible to the user. Although shown at this high level in the embodiment of FIG. 3, understand the scope of the present invention is not limited in this regard.

Figure 4:
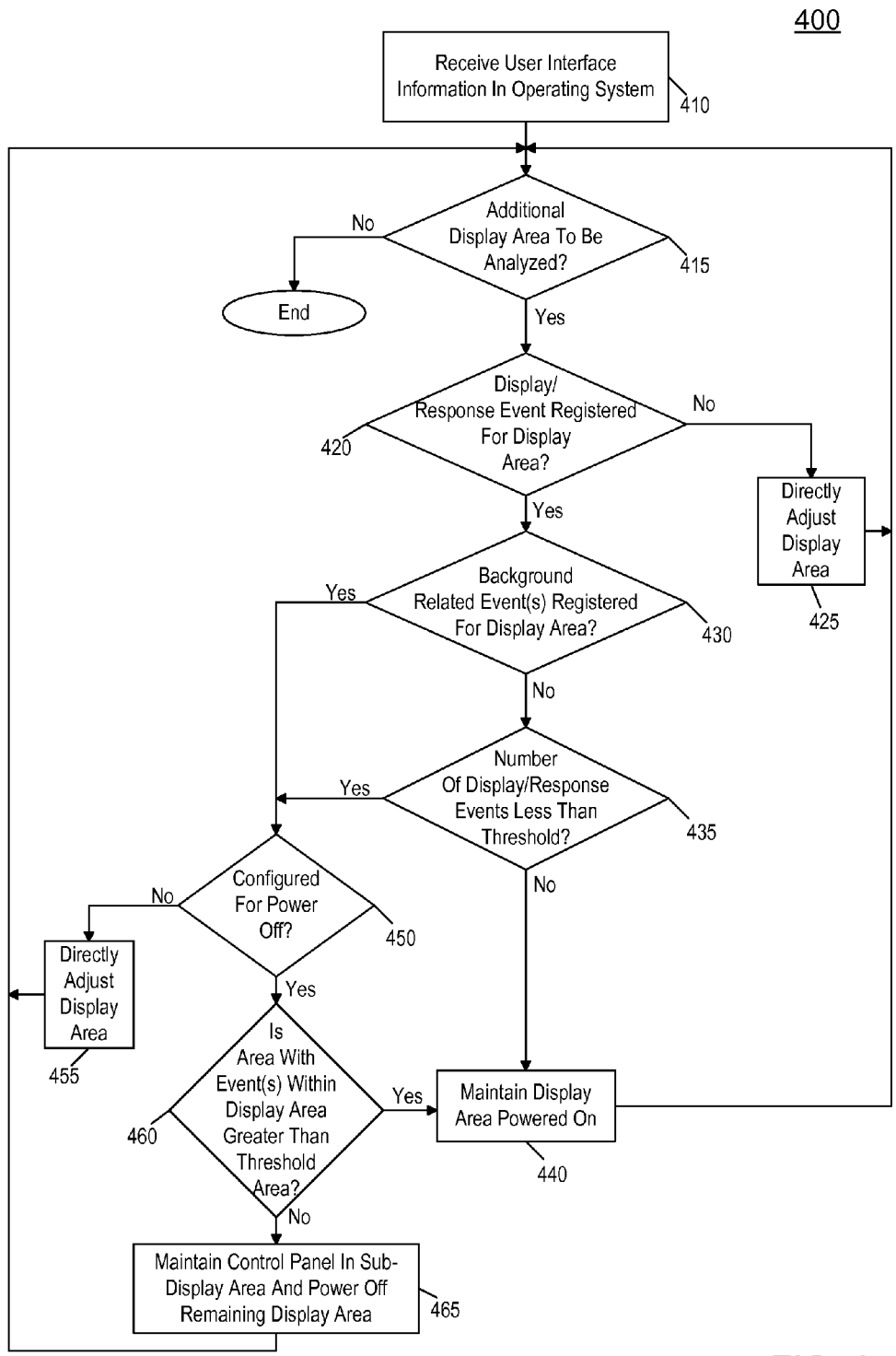
FIG. 4 is a flow diagram of a detailed method for automatically adjusting display areas in accordance with an embodiment of the present invention.

Now referring to FIG. 4, shown is a flow diagram of a detailed method for automatically adjusting display areas in accordance with an embodiment of the present invention. Method 400 of FIG. 4 also may be performed by an OS, as discussed above. As seen, method 400 begins at block 410 by receiving user interface information in the OS. This user interface information may be as described above.

Next, at diamond 415 it can be determined whether an additional display area is to be analyzed. This determination may be based on an implementation in which a display is partitioned into different display areas, e.g., based on various regular or irregular regions of the display. In some embodiments, the partitioning may be based on grouping of display regions based on the content to be displayed. Control next passes to diamond 420 where it can be determined whether a display event and/or a response event is registered for this display area. Registration of a display event corresponds to an indication that content is to be rendered in the display area such as graphical or textual information, an icon or other user selection indicator. Registration of a response event corresponds to an indication that a touch screen or other human interface device is enabled to receive a user input within this display area. If no such events are registered for the display area as determined at diamond 420, control passes to block 425 where the display area may be adjusted directly. Depending on a particular mode selected, this direct control may be by powering off the display area, reducing its brightness, resolution or other parameters.

If instead, one or more events are registered for this display area, control passes to diamond 430 where it is determined whether one or more background events are registered for the display area. If not, control passes to diamond 435 to determine whether a number of display/response events for this display area is less than a given threshold. Note that this threshold may be a predetermined number of events for this display area, a predetermined portion of the display area or so forth. If the determination at diamond 435 is in the negative, control passes to block 440 where the display area may be maintained powered on, as a significant portion of this display area is to be used to display content and/or receive user input.

Still referring to FIG. 4, if the determinations at diamonds 430 or 435 are in the positive, control passes to diamond 450 where it is determined whether the automatic display adjustment mode is configured to power off appropriate display areas. If not, control passes to block 455 where the display area may be directly adjusted such as by controlling its resolution, brightness and/or other such parameters.

If instead the display adjustment mode is configured for powering off appropriate regions, control next passes to diamond 460 to determine whether the portion of the display area having valid events is greater than a threshold amount. If so, control passes to block 440 to enable the display to be maintained. Otherwise if the area with valid events is greater than the threshold amount, a sub-display area may be defined and a control panel can be maintained in this area that enables a user selection to cause display of the otherwise present material. Thus here the method operates to provide a selectable control panel sub-display and maintain the rest of the display area powered off (block 465). As such, the method operates to modify the information that otherwise would have been displayed in this display area in non-DAAM operation. Although shown at this high level in the embodiment of FIG. 4, understand the scope of the present invention is not limited in this regard.

Figure 5:
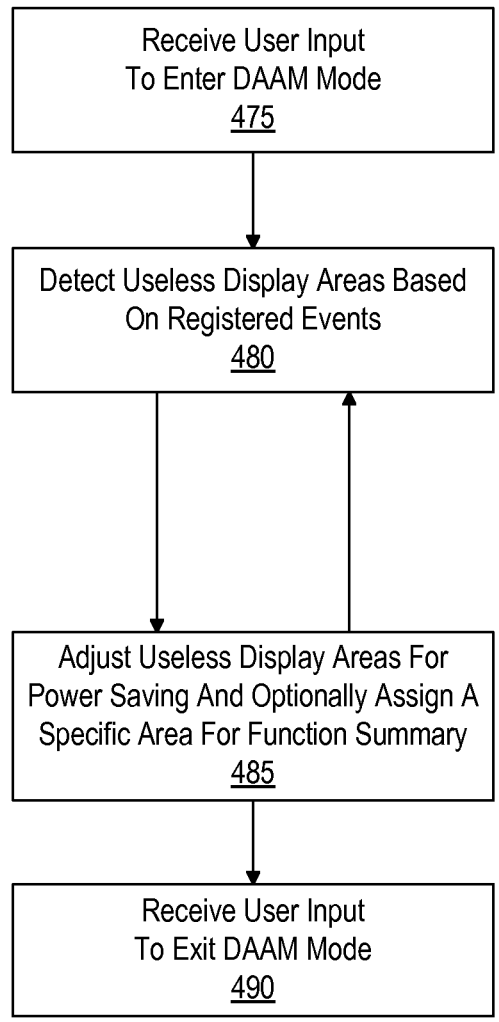
FIG. 5 is a flow diagram of a high level view of a method for performing automatic display adjustments in accordance with an embodiment of the present invention.

Referring now to FIG. 5, shown is a flow diagram of a high level view of a method for performing automatic display adjustments in accordance with an embodiment of the present invention. As shown in FIG. 5, method 470 may be executed in a processor or other hardware, e.g., responsive to OS instructions. Method 470 begins at block 475 by receiving a user input to enter into a DAAM mode. In an embodiment, this selection may be by user selection of a DAAM mode button, e.g., as part of a control panel or other configuration setting menu. Accordingly, control passes to block 480 where useless display areas may be detected based on registered events. That is, as discussed above for a given display screen such as a user interface, the OS or other logic may detect useless display areas based on a lack of registered events such as display events (e.g., painting event), response events (e.g., touch event), or any other such events that indicate activity in a particular display area. In an embodiment, display drivers or other interface mechanisms provide these event registrations to the OS which in turn may generate a display area table including a plurality of entries each having an identification of a particular display area on the display and an indication of whether the display area is to be active, or is a minimally used or useless display area, as discussed above.

Next, control passes to block 485 where the useless display areas may be adjusted for power savings. This adjustment may be by powering off such display areas or other control to reduce power consumption. Note that depending on the type of display area such as a minimally used display area or a useless display area, the logic may further optionally assign a specific sub-display area within the display area to provide a function summary such as by way of a control panel to enable user input to then access additional information on the display.

Note as different user interfaces or other display screens are selected for display, method 470 iterates between blocks 480 and 485. In addition, should the user choose to exit the DAAM mode, control passes to block 490 where a user input to exit this mode can be received, again by way of a selection of a configuration or other menu setting. Accordingly, method 470 may conclude and user interfaces and other display screens may be presented on the display in their original unedited form, with no power savings.

Figure 6:
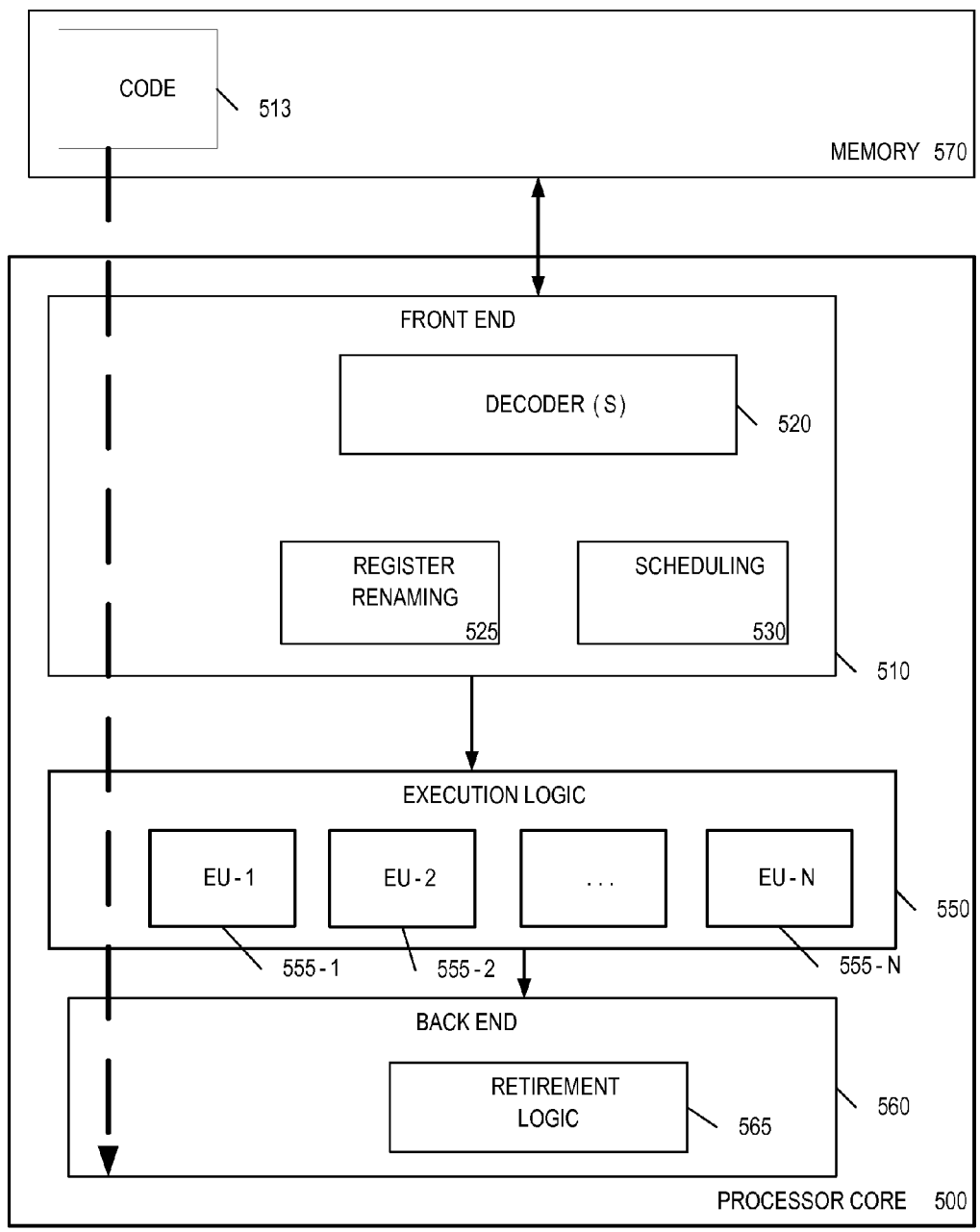
FIG. 6 is an illustration of a processor core in accordance with one embodiment of the present invention.

FIG. 6 illustrates a processor core 500 according to an embodiment. Processor core 500 may be the core for any type of processor, such as a microprocessor, an embedded processor, a digital signal processor (DSP), a network processor, or other device to execute code. Although only one processor core 500 is illustrated in FIG. 6, a processing element may alternatively include more than one of the processor core 500 illustrated in FIG. 6. Processor core 500 may be a single-threaded core or, for at least one embodiment, the processor core 500 may be multithreaded in that it may include more than one hardware thread context (or "logical processor") per core.

FIG. 6 also illustrates a memory 570 coupled to the processor 500. The memory 570 may be any of a wide variety of memories (including various layers of memory hierarchy) as are known or otherwise available to those of skill in the art. The memory 570 may include one or more code instruction(s) 513 to be executed by the processor 500. The processor core 500 follows a program sequence of instructions indicated by the code 513. Each instruction enters a front end portion 510 and is processed by one or more decoders 520. The decoder may generate as its output a micro operation such as a fixed width micro operation in a predefined format, or may generate other instructions, microinstructions, or control signals, which reflect the original code instruction. The front end 510 also includes register renaming logic 525 and scheduling logic 530, which generally allocate resources and queue the operation corresponding to the convert instruction for execution.

The processor 500 is shown including execution logic 550 having a set of execution units 555-1 through 555-N. Some embodiments may include a number of execution units dedicated to specific functions or sets of functions. Other embodiments may include only one execution unit or one execution unit that can perform a particular function. The execution logic 550 performs the operations specified by code instructions.

After completion of execution of the operations specified by the code instructions, back end logic 560 retires the instructions of the code 513. In an embodiment, the processor core 500 allows out of order execution but requires in order retirement of instructions. Retirement logic 565 may take a variety of forms as known to those of skill in the art (e.g., re-order buffers or the like). In this manner, the processor core 500 is transformed during execution of the code 513, at least in terms of the output generated by the decoder, the hardware registers and tables utilized by the register renaming logic 525, and any registers (not shown) modified by the execution logic 550.

Although not illustrated in FIG. 6, a processing element may include other elements on chip with the processor core 500. For example, a processing element may include memory control logic along with the processor core 500. The processing element may include I/O control logic and/or may include I/O control logic integrated with memory control logic. The processing element may also include one or more caches.

Figure 7:
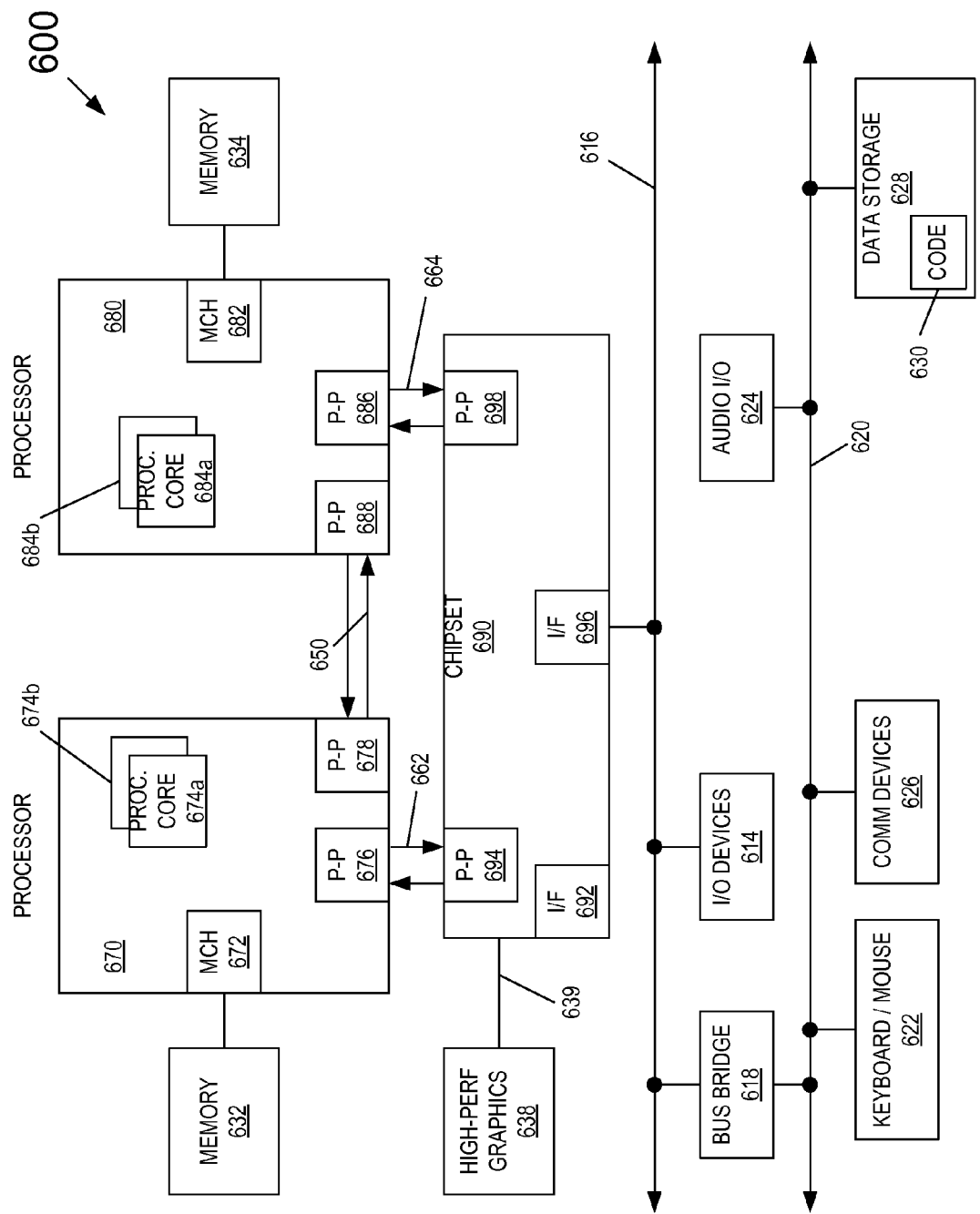
FIG. 7 is a block diagram of a system in accordance with one embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can execute an OS or other logic to perform DAAM operations, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 8:
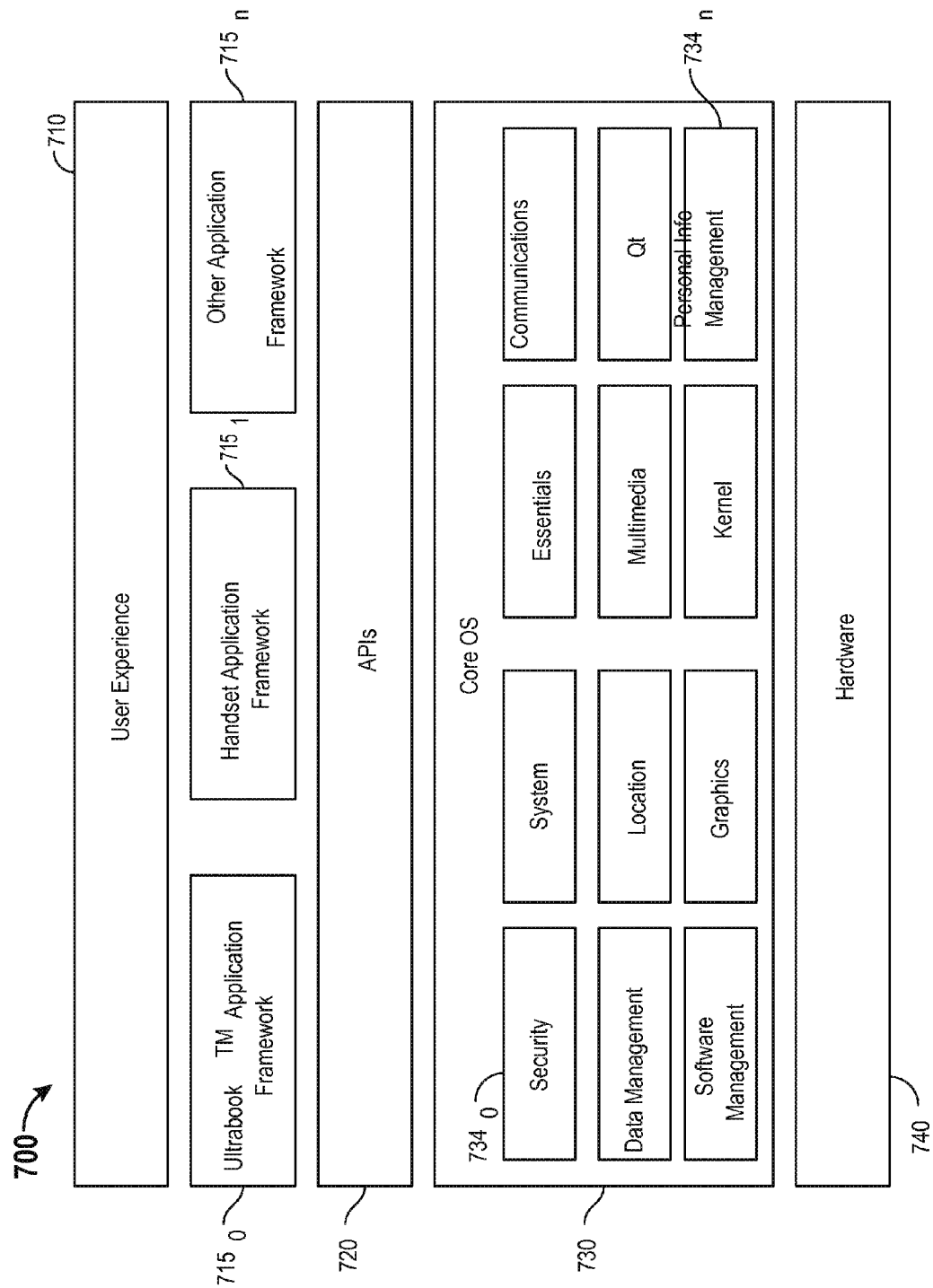
FIG. 8 is an illustration of functional components of an embodiment of a system.

The diagram of FIG. 8 illustrates functional components of an embodiment of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

As shown in FIG. 8, system 700 is implemented in various layers. At a high level, a user experience 710 is provided that enables the user to interface with various features of a system. To this end a set of application frameworks $715_0$-$715_n$ is provided. Each of these application frameworks may correspond to applications that are optimized for particular type of platform. For example, application framework $715_0$ is optimized for Ultrabook™ systems, handset application framework $715_1$ is optimized for handset-based systems such as smartphones, and application framework $715_n$ is optimized for other types of platforms such as a tablet computer or other type of system. Understand of course that many other types of application frameworks may be presented.

To enable interaction between these frameworks and a core OS 730, an application programming interface (API) layer 720 is provided. As seen in FIG. 8, core OS 730 includes various components $734_0$-$734_n$. Each of these components provides support for various functionality of the system. Particular reference here is made to a graphics component that may implement DAAM in accordance with an embodiment of the present invention. As further illustrated in FIG. 8, hardware 740 is provided. Hardware 740 may constitute the bare metal hardware of the platform and can include, at a high level, one or more processors, one or more memories (including volatile and non-volatile memories), mass storage, one or more displays, user interfaces and other typical system hardware. Although shown at this high level in the embodiment of FIG. 8, understand the scope of the present invention is not limited in this regard.

Figure 9:
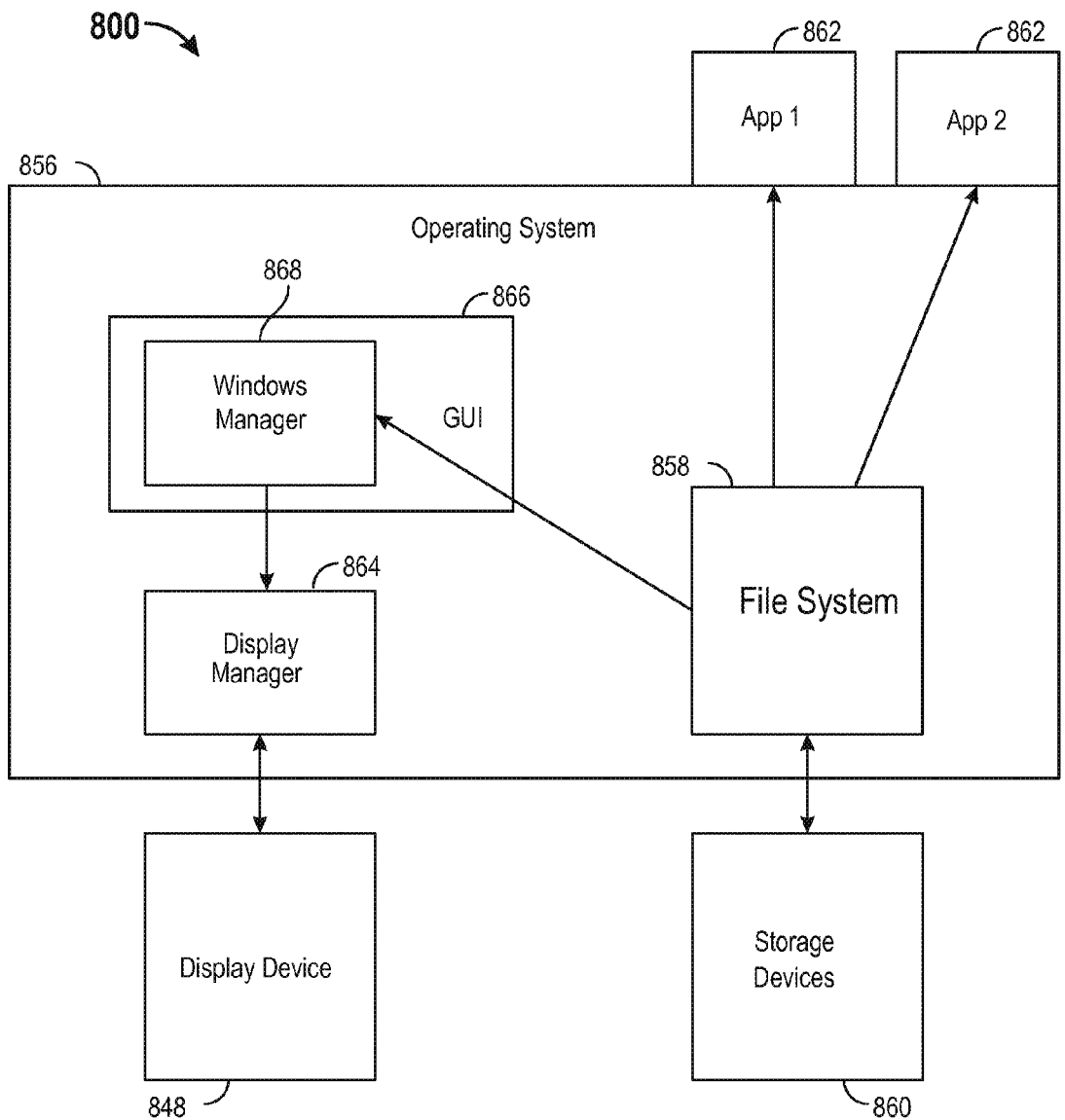
FIG. 9 is a schematic block diagram showing how information can be displayed to a user of a compute node in an embodiment of the invention.

FIG. 9 is a schematic block diagram 800 showing how information can be displayed to a user of a compute node in an embodiment of the invention. For example, an operating system 856 can include a display manager 864, which may control information that is presented to a display device 848 for display to the user, including execution of DAAM operations as described herein. A graphical user interface 866 is another component of the operating system 856 that interacts with the display manager 864 to present information on the display device 848. For example, the graphical user interface 866 can provide the display manager 864 with data that describes the appearance and position of windows, icons, control elements, and similar types of user interface objects. The graphical user interface 866 might provide this information directly to the display manager 864, or via a windows manager 868. The windows manager 868 can control the display of windows in which data is presented to the user according to the DAAM techniques described herein. Such data may be documents generated by application programs 862, or the contents of a file system 858, storage device 860, or both.

Figure 10:
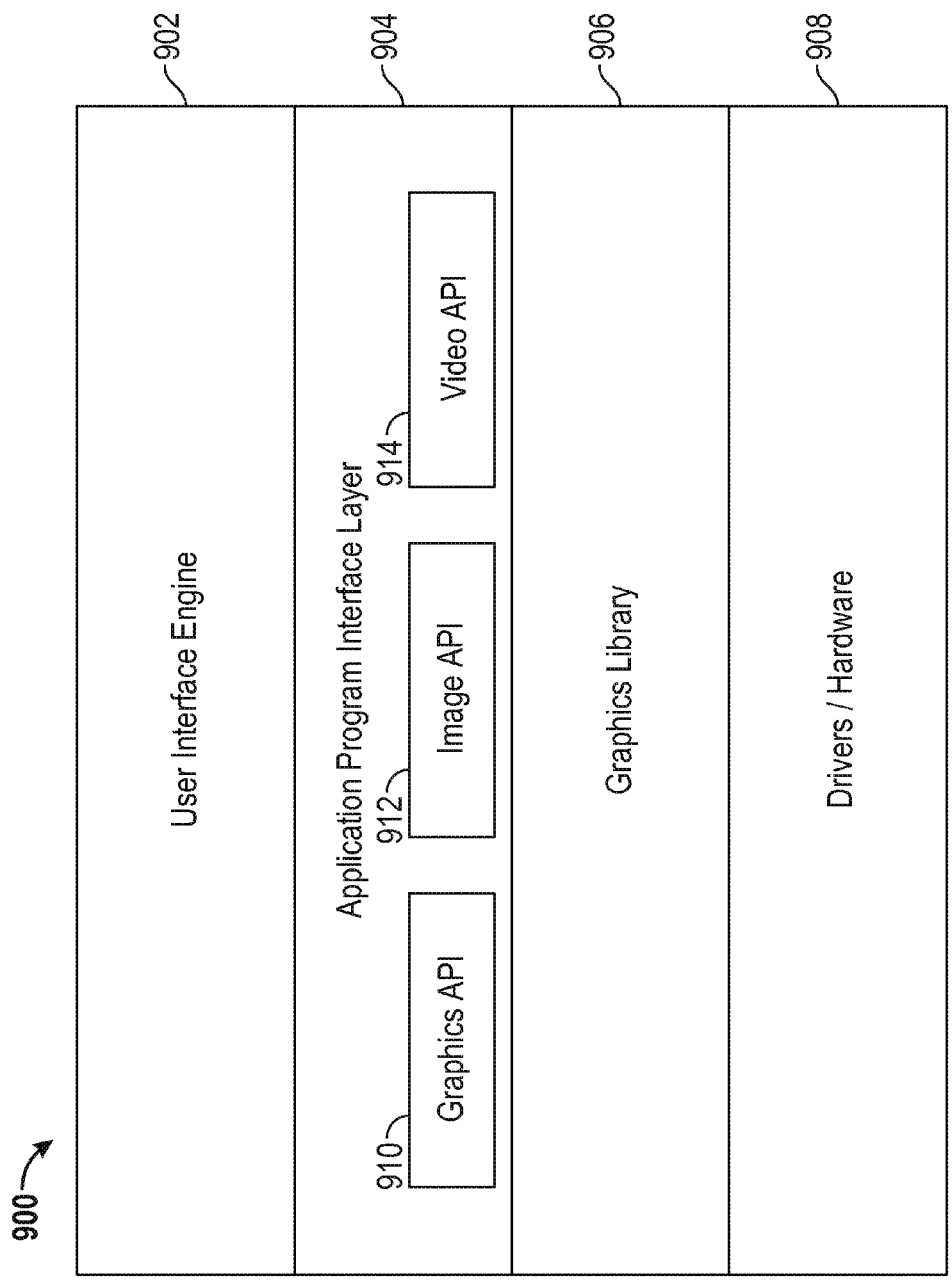
FIG. 10 is a block diagram of an example system layer structure that can be utilized to implement an embodiment described herein.

FIG. 10 is a block diagram of an example system layer structure 900 that can be utilized to implement an embodiment described herein. Other system layer implementations, however, can also be used. In some implementations, a user interface engine, such as the user interface (UI) engine 902, or another UI engine capable of generating a three-dimensional user interface environment, operates at an application level and implements graphical functions and features available through an application program interface (API) layer 904. Example graphical functions and features include graphical processing, supported by a graphics API 910, image processing, supported by an imaging API 912, and video processing, supported by a video API 914. The API layer 904, in turn, interfaces with a graphics library layer 906. The graphics library layer 904 can be implemented, for example, as a software interface to graphics hardware, such as an implementation of the OpenGL specification. A driver/hardware layer 908 includes drivers and associated graphics hardware, such as a graphics card and associated drivers.

In an embodiment, use of the term control logic includes hardware, such as transistors, registers, or other hardware, such as programmable logic device; control logic may also include software or code, which may be integrated with hardware, such as firmware or micro-code. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

The following examples pertain to further embodiments. Specifics in the examples may be used anywhere in one or more embodiments.

In one example, a system comprises a processor to execute instructions and including a logic to configure a display for a first mode in which the display is partitioned into a plurality of display areas, and to control at least one first display area to operate at a first power consumption level and to control at least one second display area to operate at a second power consumption level based on event registration information for a first user interface to be displayed on the display. The system further includes the display to display the first user interface and HID associated with the display.

In an embodiment, the at least one first display area is to operate at the first power consumption level in the first mode and at the second power consumption level in a second mode, the first power consumption level less than the second power consumption level. The at least one first display area may be powered off at the first power consumption level. The at least one second display area comprises an active display area and the at least one first display area comprises an unused display area.

In an embodiment, the logic is to maintain a control panel in a sub-display portion of the first display area and power off a remaining portion of the first display area, where the control panel includes a first selection button and a second selection button. The at least one first display area may be controlled to have at least one of a reduced brightness and a reduced resolution in the first mode.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

As another example, an apparatus for controlling a display includes: means for receiving user interface information for a user interface to be displayed on the display; means for determining whether a display event or a response event is registered for a first display area of the display based on the user interface information; and means for adjusting the first display area to reduce power consumption of the first display area.

In an embodiment, the apparatus further includes means for determining whether a background related event is registered for a second display area of the display.

In an embodiment, the apparatus further includes means for comparing a number of events in the second display area to a threshold.

In an embodiment, the apparatus further includes means for determining whether a portion of the second display area having events is greater than a threshold area and if so, maintaining a control panel in a sub-display portion of the second display area and powering off a remaining portion of the second display area.

As an example, the control panel may include at least a first selection button and a second selection button to enable the user to access additional selected items.

In different embodiments, the display area adjustment comprises controlling a brightness of the first display area and/or powering down the first display area.

In an embodiment, the apparatus further includes means for receiving a user selection of a display area adjustment mode and configuring the display for the display area adjustment mode responsive thereto.

In an embodiment, the apparatus further includes means for partitioning the display into a first plurality of display areas and a second plurality of display areas, and enabling the first plurality of display areas and powering down the second plurality of display areas, e.g., based on the user interface information.

Another example is directed to a method for receiving user interface information including event registrations for a user interface to be displayed on a display of a system in a first logic of the system, partitioning the display into at least one unused display area and at least one active display area based on the event registrations, power managing the at least one unused display area, and maintaining the at least one active display area fully powered.

In an embodiment, the method includes power managing at least one minimally used display area, where the at least one minimally used display area is power managed differently than the at least one unused display area.

In an embodiment, the method includes power managing the at least one minimally used display area by adjusting a brightness thereof.

In an embodiment, the method further includes power managing the at least one minimally used display area by displaying a control panel in a first portion of the at least one minimally used display area and powering down a second portion of the at least one minimally used display area.

In an embodiment, the method further includes receiving a user selection of a display area automatic adjustment mode and configuring the display for the display area automatic adjustment mode responsive thereto.

In an embodiment, the method further includes partitioning a first display area into the at least one unused display area if no display event is registered for the first display area, and partitioning a second display area into at least one minimally used display area if a background related event is registered for the second display area.

In an example, a machine readable medium includes code, when executed, to cause a machine to perform the method of any of the above-described examples.

In another example, an apparatus comprises means to perform a method of any of the above-described examples.

In another example, at least one storage medium has instructions stored thereon for causing a system to: receive user interface information for a user interface to be displayed on a display of the system, determine whether a display event or a response event is registered for a first display area of the display based on the user interface information, and if not, adjust the first display area to reduce power consumption of the first display area.

In an example, the at least one storage medium further comprises instructions to determine whether a background related event is registered for a second display area of the display.

In an example, the at least one storage medium further comprises instructions to compare a number of events in the second display area to a threshold.

In an example, the at least one storage medium further comprises instructions to determine whether a portion of the second display area having events is greater than a threshold area and if so, maintain a control panel in a sub-display portion of the second display area and power off a remaining portion of the second display area.

In an example, the at least one storage medium further comprises instructions to receive a user selection of a display area adjustment mode and to configure the display for the display area adjustment mode responsive thereto.

In an example, the at least one storage medium further comprises instructions to partition the display into a first plurality of display areas and a second plurality of display areas, and to enable the first plurality of display areas and to power down the second plurality of display areas.

In an example, the at least one storage medium further comprises instructions to partition the display based on the user interface information.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

An embodiment may be implemented in program code, or instructions, which may be stored in, for example, volatile and/or non-volatile memory, such as storage devices and/or an associated machine readable or machine accessible medium including, but not limited to floppy disks, optical storage, solid-state memory, hard-drives, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to:
   receive user interface information for a user interface to be displayed on a display of the system, the user interface information including one or more event registrations provided to an operating system (OS) by a software agent having the user interface;
   determine whether a display event or a response event of the one or more event registrations is registered for a first display area of the display based on the user interface information;
   determine whether a background related event of the one or more event registrations is registered for a second display area of the display based on the user interface information; and
   if the display event or the response event is not registered for the first display area, adjust the first display area to reduce power consumption of the first display area.

2. The at least one non-transitory storage medium of claim 1, further comprising instructions to compare a number of events of the one or more event registrations in the second display area to a threshold.

3. The at least one non-transitory storage medium of claim 2, further comprising instructions to determine whether a portion of the second display area having events is greater than a threshold area and if so, maintain a control panel in a sub-display portion of the second display area and power off a remaining portion of the second display area.

4. The at least one non-transitory storage medium of claim 3, wherein the control panel comprises at least a first selection button and a second selection button to enable the user to access additional selected items.

5. The at least one non-transitory storage medium of claim 1, wherein the display area adjustment comprises controlling a brightness of the first display area.

6. The at least one non-transitory storage medium of claim 1, wherein the display area adjustment comprises powering down the first display area.

7. The at least one non-transitory storage medium of claim 1, further comprising instructions to receive a user selection of a display area adjustment mode and to configure the display for the display area adjustment mode responsive thereto.

8. The at least one non-transitory storage medium of claim 1, further comprising instructions to partition the display into a first plurality of display areas and a second plurality of display areas, and to enable the first plurality of display areas and to power down the second plurality of display areas.

9. The at least one non-transitory storage medium of claim 8, further comprising instructions to partition the display based on the user interface information.

10. A method comprising:
   receiving user interface information including event registrations provided to an operating system (OS) by a software agent having a user interface to be displayed on a display of a system in a first logic of the system;
   partitioning the display into at least one unused display area and at least one active display area based on the event registrations;
   partitioning a first display area into the at least one unused display area if no display event is registered for the first display area;
   partitioning a second display area into at least one minimally used display area if a background related event is registered for the second display area;
   power managing the at least one unused display area; and
   maintaining the at least one active display area fully powered.

11. The method of claim 10, further comprising power managing the at least one minimally used display area, wherein the at least one minimally used display area is power managed differently than the at least one unused display area.

12. The method of claim 11, further comprising power managing the at least one minimally used display area by adjusting a brightness thereof.

13. The method of claim 11, further comprising power managing the at least one minimally used display area by displaying a control panel in a first portion of the at least one minimally used display area and powering down a second portion of the at least one minimally used display area.

14. The method of claim 10, further comprising receiving a user selection of a display area automatic adjustment mode and configuring the display for the display area automatic adjustment mode responsive thereto.

15. A system comprising:
   a processor to execute instructions and including a logic to configure a display for a first mode in which the display is partitioned into a plurality of display areas, and to control at least one first display area to operate at a first power consumption level and to control at least one second display area to operate at a second power consumption level based on event registration information for a first user interface to be displayed on the display, wherein the logic is to maintain a control panel in a sub-display portion of the at least one first display area and power off a remaining portion of the at least one first display area responsive to a determination based at least in part on the event registration information that a portion of the at least one first display area having one or more event registrations is greater than a threshold area, the control panel comprising a first selection button and a second selection button; and
   the display to display the first user interface.

16. The system of claim 15, wherein the at least one first display area is to operate at the first power consumption level in the first mode and at the second power consumption level in a second mode, the first power consumption level less than the second power consumption level.

17. The system of claim 15, wherein the at least one first display area is to be powered off at the first power consumption level.

18. The system of claim 15, wherein the at least one second display area comprises an active display area and the at least one first display area comprises an unused display area.

19. The system of claim 15, wherein the at least one first display area is controlled to have at least one of a reduced brightness and a reduced resolution in the first mode.

* * * * *